(12) United States Patent
Modave et al.

(10) Patent No.: US 11,669,610 B2
(45) Date of Patent: Jun. 6, 2023

(54) AUTHENTICATION DEVICE, METHOD AND SYSTEM

(71) Applicant: PROTON WORLD INTERNATIONAL N.V., Diegem (BE)

(72) Inventors: Jean-Louis Modave, Ottignies (BE); Michael Peeters, Tourinnes-la-Grosse (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 158 days.

(21) Appl. No.: 17/224,013

(22) Filed: Apr. 6, 2021

(65) Prior Publication Data
US 2021/0319089 A1  Oct. 14, 2021

(30) Foreign Application Priority Data
Apr. 9, 2020 (FR) .................................... 2003585

(51) Int. Cl.
*G06F 21/44* (2013.01)
*G06F 21/51* (2013.01)
*G06F 21/72* (2013.01)
*G06F 21/45* (2013.01)
*G06F 21/74* (2013.01)

(52) U.S. Cl.
CPC ............ *G06F 21/44* (2013.01); *G06F 21/45* (2013.01); *G06F 21/51* (2013.01); *G06F 21/72* (2013.01); *G06F 21/74* (2013.01)

(58) Field of Classification Search
CPC .......... G06F 21/44; G06F 21/45; G06F 21/51; G06F 21/72; G06F 21/74; G06F 21/71; G06F 21/445
See application file for complete search history.

(56) References Cited

U.S. PATENT DOCUMENTS

| 6,493,278 B2 | 12/2002 | Takata et al. |
| 7,003,676 B1 | 2/2006 | Weber et al. |
| 10,949,527 B2 | 3/2021 | Tanimoto et al. |

(Continued)

FOREIGN PATENT DOCUMENTS

| EP | 1 172 822 | 1/2002 | |
| EP | 1172822 A1 * | 1/2002 | ............. G11C 16/22 |

(Continued)

OTHER PUBLICATIONS

"Interrupt," Wikipedia, archived Jun. 12, 2013, old revision edited by The Anome, URL=https://en.wikipedia.org/w/index.php?title=Interrupt&oldid=559617828, download date Oct. 11, 2016. (7 pages).

*Primary Examiner* — Nelson S. Giddins
(74) *Attorney, Agent, or Firm* — Seed Intellectual Property Law Group LLP

(57) ABSTRACT

The present disclosure relates to an authentication method of a first device by a second device, each first, second device having a processor, at least one memory, and an authentication circuit, in which the authentication circuit is configured to prohibit the processor from reading data stored in at least part of said memory. The authenticating includes generating a first datum, and a second datum. The second device verifies that the first and second data match.

30 Claims, 2 Drawing Sheets

(56) References Cited

U.S. PATENT DOCUMENTS

| | | |
|---|---|---|
| 2005/0188200 A1 | 8/2005 | Kwok |
| 2011/0088084 A1* | 4/2011 | Yasaki ................ G06F 21/6218 726/5 |
| 2012/0030443 A1 | 2/2012 | Wuidart |

FOREIGN PATENT DOCUMENTS

| | | | |
|---|---|---|---|
| EP | 1 569 381 | 8/2005 | |
| EP | 1569381 A1 * | 8/2005 | ............. G06F 21/44 |
| EP | 3 486 832 | 5/2019 | |

* cited by examiner

AUTHENTICATION DEVICE, METHOD AND SYSTEM

BACKGROUND

Technical Field

The present disclosure relates generally to electronic devices or circuits. The present description applies, for example, to an authentication method between two electronic devices or circuits for example preceding a main communication method between these two devices or circuits.

Description of the Related Art

A communication between two electronic devices, or circuits, is often preceded by an authentication phase. During this phase, an authentication method, implemented by the two devices, makes it possible to verify whether the two devices are authorized to communicate with one another. The authentication method is a first means of protection against malicious devices trying to access data and/or functionalities of other devices.

One exemplary authentication method used is an authentication method of the Verifier/Prover type, or Challenge/Response type, between a verifier and a prover. In this type of authentication, a prover sends a verifier a secret datum, for example a password, to authenticate itself. The verifier is capable of verifying whether the secret datum is compliant in order to grant the authentication. As an example, the verifier knows the secret datum, it performs a simple comparison with the datum that it receives from the prover.

BRIEF SUMMARY

There is a need for more reliable authentication methods.

There is more particularly a need for more reliable authentication methods of the challenge/response type between a verifier and a prover.

One embodiment facilitates addresses all or some of the drawbacks of the known authentication methods, and more particularly all or some of the drawbacks of the known authentication methods of the challenge/response type between a verifier and a prover.

One embodiment provides an authentication method of a first device by a second device that is at least partially the same as the first device, each first, second device comprising a processor, at least one memory, and an authentication module, in which the authentication module comprises a first circuit configured to prohibit the processor from reading data stored in at least part of said memory, comprising the following steps:

the first device generates a first datum, and the second device generates a second datum; and the second device verifies that the first and second data match.

According to one embodiment, the authentication module comprises a second circuit configured to provide a datum to the processor each time the reading of a datum stored in at least part of said memory is prohibited.

According to one embodiment, the authentication method is of the Verifier/Prover type.

According to one embodiment, each first, second device comprises at least one volatile memory, and at least one non-volatile memory.

According to one embodiment, the first circuit is configured to prohibit the processor from reading data stored in said volatile memory, and at least one part of said non-volatile memory.

According to one embodiment, said at least one part of said memory is a part only storing data.

According to one embodiment, the first circuit is configured to prohibit the processor from writing data in part of said at least one memory.

According to one embodiment, the first circuit is configured to prohibit the processor from writing data in all of said at least one memory.

According to one embodiment, the first circuit is configured to prohibit the processor from executing instructions stored in part of said at least one memory.

According to one embodiment, the first circuit is configured to prohibit the processor from executing instructions stored in said volatile memory, and at least one part of said non-volatile memory.

According to one embodiment, the method comprises an initial step for saving the state of the processor of each first and second device.

According to one embodiment, the method comprises a state sharing step in which the processor of the second device shares its state with the processor of the first device.

According to one embodiment, the authentication module generates the shared state during the state sharing step.

According to one embodiment, the processors of the first and second devices generate the first and second data by executing the same instructions.

According to one embodiment, the authentication module comprises a third circuit configured to generate an interruption signal of the authentication method.

Another embodiment provides an electronic device configured to carry out the method previously described.

In an embodiment, a method comprises: authenticating, by a first device, a second device; restricting, during the authentication of the second device and under control of authentication circuitry of the first device, access of a processor of the first device to one or more memory areas of the first device, the restricting including interrupting the authenticating in response an attempt of the processor to access a first area of the one or more memory areas of the first device; and restricting, during the authentication of the second device and under control of authentication circuitry of the second device, access of a processor of the second device to one or more memory areas of the second device, the restricting including interrupting the authenticating in response an attempt of the processor to access a first area of the one or more memory areas of the second device, wherein the authenticating includes: generating, using the first device, a first datum; generating, using the second device, a second datum; and authenticating, by the first device and based on the first datum and the second datum, the second device. In an embodiment, the method comprises: responding, by the authentication circuitry of the first device, to an attempt of the processor of the first device to read a second area of the one or more memory areas of the first device by providing dummy data to the processor of the first device; and responding, by the authentication circuitry of the second device, to an attempt of the processor of the second device to read a second area of the one or more memory areas of the second device by providing dummy data to the processor of the second device. In an embodiment, the authentication is of a Verifier/Prover type. In an embodiment, the one or more memory areas of the first device include at least one volatile memory area, and at least one non-volatile memory area;

and the one or more memory areas of the second device include at least one volatile memory area, and at least one non-volatile memory area. In an embodiment, the authentication circuitry of the first device restricts reading by the processor of the first device of data stored in said at least one volatile memory area, and at least one part of said at least one non-volatile memory area. In an embodiment, said at least one part of said at least one non-volatile memory area is a part only storing data. In an embodiment, the authentication circuitry of the first device restricts the processor of the first device from writing data in at least one memory area of the one or more memory areas of the first device. In an embodiment, the authentication circuitry of the first device restricts the processor from writing data in all of the one or more memory areas of the first device. In an embodiment, the authentication circuitry of the first device restricts the processor from executing instructions stored in at least one memory area of the one or more memory areas of the first device. In an embodiment, the authentication circuitry of the first device restricts the processor from executing instructions stored in said at least one volatile memory area, and at least one part of said at least one non-volatile memory area. In an embodiment, the authenticating comprises: saving a state of the processor of the first device and saving a state of the processor of the second device. In an embodiment, the authenticating comprises sharing state information of the second device with the processor of the first device. In an embodiment, the authentication circuitry of the first device generates the shared state information. In an embodiment, the processor of the first device generates the first datum by executing instructions; and the processor of the second device generates the second datum by executing the same instructions. In an embodiment, the authentication circuitry of the first device comprises a circuit configured to generate an interruption signal of the authentication method.

In an embodiment, a system comprises: a first device having a processor, memory, and authentication circuitry coupled between the processor and the memory; and a second device having a processor, memory, and authentication circuitry coupled between the processor and the memories, wherein the first and second devices, in operation, concurrently execute an authentication process, the authentication process including: restricting, under control of the authentication circuitry of the first device, access of the processor of the first device to the memory of the first device, the restricting including interrupting the authenticating process in response an attempt of the processor of the first device to access a first area of the memory of the first device; and restricting, under control of the authentication circuitry of the second device, access of the processor of the second device to the memory of the second device, the restricting including interrupting the authenticating process in response an attempt of the processor of the second device to access a first area of the memory of the second device; generating, using the first device, a first datum; generating, using the second device, a second datum; and authenticating one of the first device and the second device by the other of the first device and the second device based on the first datum and the second datum. In an embodiment, the authenticating comprises: responding, by the authentication circuitry of the first device, to an attempt of the processor of the first device to read a second area of the memory of the first device by providing dummy data to the processor of the first device; and responding, by the authentication circuitry of the second device, to an attempt of the processor of the second device to read a second area of the memory of the second device by providing dummy data to the processor of the second device. In an embodiment, the memory of the first device includes at least one volatile memory area, and at least one non-volatile memory area; and the memory of the second device includes at least one volatile memory area, and at least one non-volatile memory area. In an embodiment, the authentication circuitry of the first device restricts reading by the processor of the first device of data stored in said at least one volatile memory area, and at least one part of said at least one non-volatile memory area. In an embodiment, the authenticating comprises: saving a state of the processor of the first device and saving a state of the processor of the second device. In an embodiment, the authenticating comprises sharing state information of the second device with the processor of the first device.

In an embodiment, a device comprises: a processor; memory; and authentication circuitry coupled between the processor and the memory, wherein, in operation, the device currently executes an authentication process with a mirror device, the authentication process including: restricting, under control of the authentication circuitry, access of the processor to the memory, the restricting including interrupting the authenticating process in response to an attempt of the processor to access a first area of the memory; and generating a first datum, wherein the authenticating is based on the first datum and a second datum generated by the mirror device. In an embodiment, in operation, the device authenticates the mirror device based on the first datum and the second datum. In an embodiment, in operation, the device provides the first datum to the mirror device during the authentication process. In an embodiment, the device provides the first datum to the mirror device in an encrypted form. In an embodiment, the authenticating comprises: responding, by the authentication circuitry of the device, to an attempt of the processor to read a second area of the memory by providing dummy data to the processor. In an embodiment, the memory of the device includes at least one volatile memory area, and at least one non-volatile memory area. In an embodiment, the authenticating comprises: saving a state of the processor. In an embodiment, the authenticating comprises sharing state information of the device with the mirror device.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures, unless the context indicates otherwise. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, within 5%.

Figure 1:
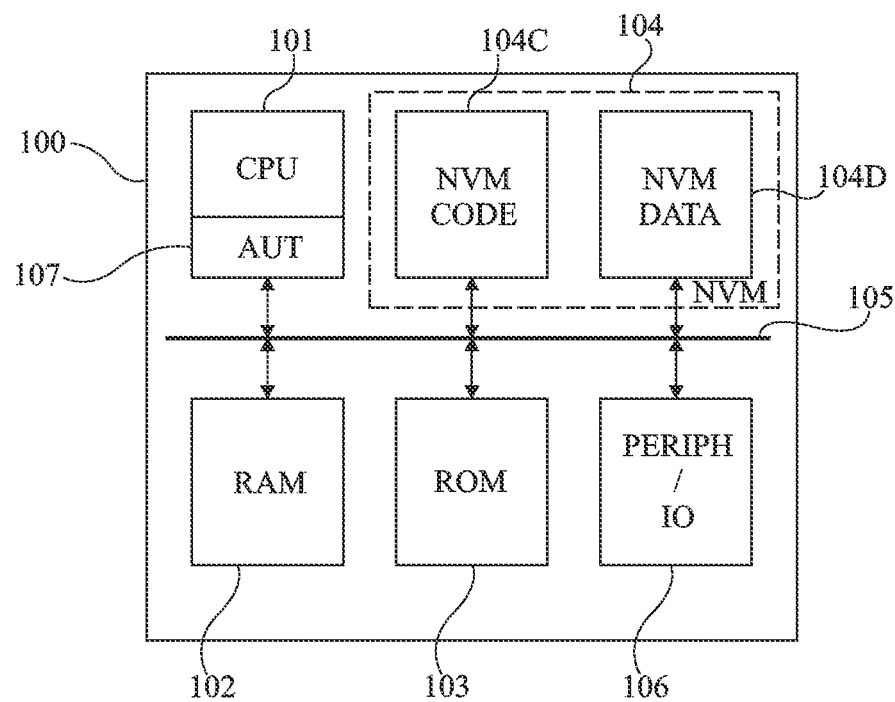
FIG. 1 shows, schematically and in block diagram form, an embodiment of an electronic circuit.

FIG. 1 shows, schematically and in block diagram form, an architecture of one embodiment of an electronic device 100.

The device 100 comprises a processor 101 (CPU) configured to execute instructions and commands, and to process data stored in different memories. The processor 101 is described in more detail in relation with FIG. 2.

The device 100 further comprises a volatile memory 102 (RAM) configured to store data during the implementation of the device 100, for example execution data.

The device 100 further comprises a read-only memory 103 (ROM) configured to store data permanently. As an example, the read-only memory 103 stores initialization data (boot data) of the device 100.

The device 100 further comprises a non-volatile memory 104 (NVM) (designated in dotted lines in FIG. 1) configured to store data over several successive implementations of the device 100. The non-volatile memory 104 is configured to store different types of information. More particularly, part 104C (NVM CODE) of the memory 104 is configured to store software instructions, and a second part 104D (NVM DATA) is configured to store data.

The device 100 further comprises a bus 105 configured to transmit data among the different components of the device 100.

The device 100 further comprises a peripheral module or circuit 106 (PERIPH/IO) configured to implement functions of the device 100 and/or to serve as an interface to exchange data and/or instructions with other circuits. The module 106 can be made up of several different circuits each configured to implement one or several specific functions.

According to one embodiment, the device 100 further comprises an authentication module or circuit 107 (AUT). The authentication module 107 is arranged between the bus 105 and the processor 101, so as to make the connection between the bus 105 and the processor 101. The module 107 is described in more detail in relation with FIG. 2.

Figure 2:
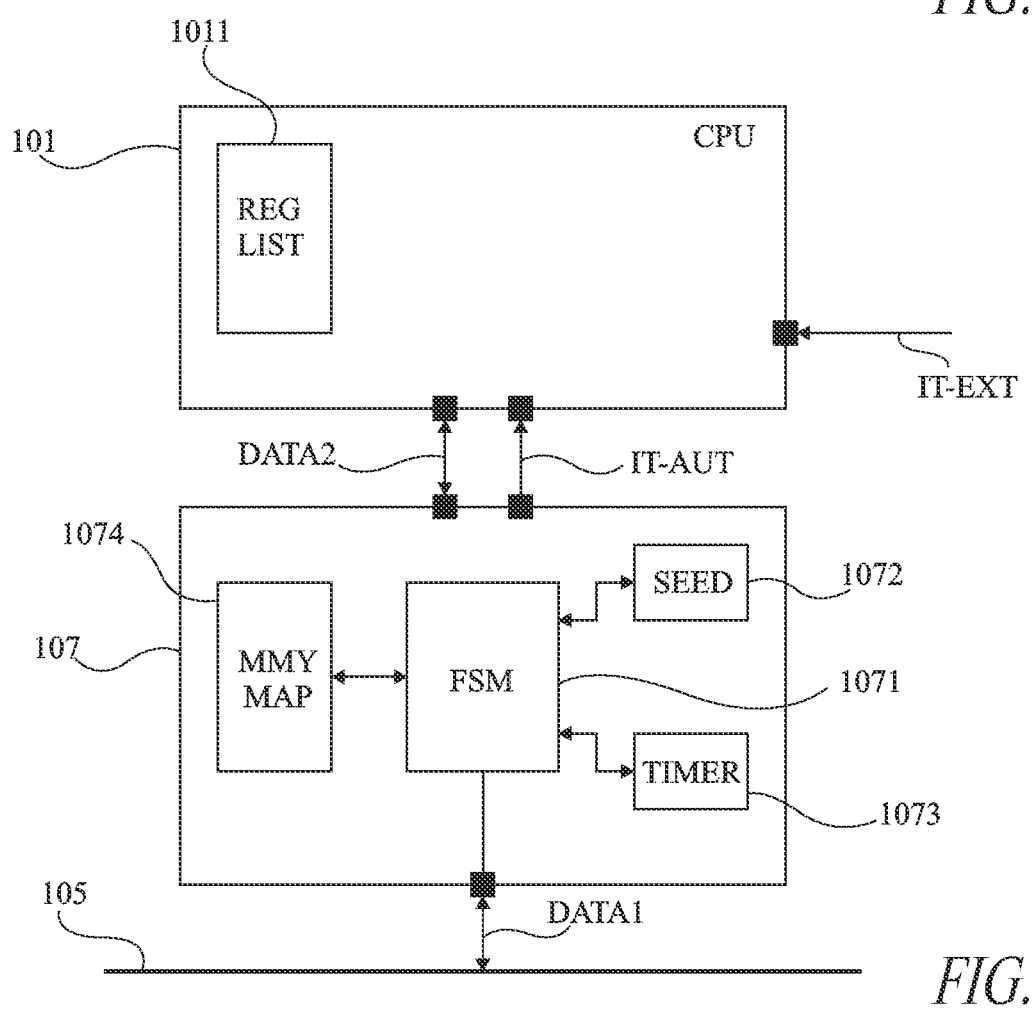
FIG. 2 shows, schematically, in block diagram form and in more detail, part of the circuit of FIG. 1.

FIG. 2 shows, schematically, in block diagram form and in more detail, the processor 101 (CPU) and the authentication module 107 of the device 100 described in connection with FIG. 1.

The processor 101 comprises, inter alia, at least one register list 1011 (REG LIST) configured to store data and/or instructions.

The processor 101 is configured to receive data and/or instructions coming from memories 102, 103 and 104 transmitted by the bus 105. As previously stated, the authentication module 107 is arranged between the processor 101 and the bus 105. Thus, the data and/or instructions transmitted by the bus 105 are first transmitted to the module 107 (transmission symbolized in FIG. 2 by an arrow DATA1). Secondly, these data and/or instructions are transmitted by the module 107 to the processor 101 (transmission symbolized in FIG. 2 by an arrow DATA2).

The processor 101 is further configured to receive interruption signals IT-AUT sent by the module 107, and interruption signals IT-EXT sent by other components of the device 100, for example, the peripheral module 106. An interruption signal is an instruction indicating to the processor 101 to stop or pause the computations in progress in order, for example, to implement new instructions.

The authentication module 107 comprises a finite state machine 1071 (FSM). The finite state machine 1071 is configured to receive and/or send data with the data bus 105 and with the processor 101. More particularly, the finite state machine 1071 is configured to act as an intermediary between the processor 101 and the data bus 105.

The authentication module 107 further comprises a data generating circuit 1072 (SEED). The data generating circuit 1072 for example makes it possible to generate a random datum, or to provide a datum stored in a register list. The data generating module 1072 is configured to exchange data with the finite state machine 1071.

The authentication module 107 further comprises an interruption circuit 1073 (TIMER). The interruption circuit 1073 is configured to end an authentication method of the device 100 by sending the interruption signal IT-AUT to the processor 101. The interruption circuit 1073 is configured to exchange data and/or instructions with the finite state machine 1071.

As an example, the interruption circuit 1073 is a counter configured to send an interruption signal when it reaches a threshold number of iterations. According to another example, the interruption circuit 1073 is configured to send the interruption signal upon receiving a specific instruction.

According to a variant embodiment, an interruption signal can be generated from a code or an instruction stored in the part 104C of the non-volatile memory 104. This instruction could be the last instruction implemented by the processor during the execution of the authentication method of the device 100. One advantage of this variant is that such an instruction makes it possible to stop the authentication method before the involuntary reading of instructions stored in the non-volatile memory that do not relate to the authentication method.

The authentication module 107 further comprises a control circuit 1074 (MMY MAP) configured to control the exchanges of data and/or instructions between the processor 101 and the bus 105. To that end, the control circuit 1074 is configured to exchange data and/or instructions with the finite state machine 1071. According to one embodiment, the control circuit 1074 is configured to control, for example to filter, the data and/or the instructions exchanged between the processor 101 and the bus 105, for example, based on their nature and/or their origin.

According to one embodiment, the control circuit 1074 is more particularly configured to filter the data and/or the instructions coming from the bus 105 during the implementation of an authentication method of the device 100. Such a method is described in relation with FIG. 3. More specifically, during the implementation of said authentication method of the device 100, the control circuit 1074 is configured to determine which data the processor can read, which data the processor can write, and which instructions the processor can implement.

According to one embodiment, during the authentication method, the processor 101 is authorized to read data coming from the read-only memory 103 and the part 104C storing commands and instructions of the non-volatile memory 104, but it is prohibited from reading data coming from other memories of the device 100, that is to say from the volatile memory 102, the part 104D storing data of the non-volatile memory 104, and the peripheral module 106. As an example, when the processor 101 receives a datum from a memory, or part of a memory, that it cannot read, the data generating circuit 1072 provides a replacement datum.

According to one embodiment, during the authentication method, the processor 101 cannot write data in any of the memories of the device 100. Thus, the data stored in the memories 102, 103 and 104 are not corrupted by data used solely for the authentication method, or then secret authentication data are not stored in the memories 102, 103 and 104. According to one variant embodiment, the processor 101 can be authorized to write data in part of one of the memories of the device 100, for example, in part of the volatile memory 102.

According to one embodiment, during the authentication method, the processor 101 is authorized to receive and implement instructions coming from the read-only memory 104 and the part 104C storing the commands and instructions of the non-volatile memory 104, but it is prohibited from receiving and implementing instructions coming from the volatile memory 102, the part 104D of the non-volatile memory 104, and the peripheral module 106. As an example, the control circuit 1074 further prevents all of the interruption signals coming from the volatile memory 102, the part 104D of the non-volatile memory 104, and the peripheral module 106 from being taken into account.

The operation of the authentication module 107 is as follows. During the implementation of an authentication method of the Verifier/Prover type, the processor 101 of the device 100 executes a series of instructions allowing it to produce a secret datum. When the device 100 serves as verifier, the secret datum makes it possible to verify the secret datum coming from a prover device. When the device 100 serves as prover, this produced secret datum is sent to a verifier device. The authentication module 107 makes it possible, during the execution of these instructions, to select the instructions that the processor 101 can implement, and the data that the processor 101 can read and/or write. When an instruction requests the reading of a datum in a memory part to which the processor 101 does not have access, the data generating circuit 1072 replaces the datum to be read with another datum, for example a random datum. The authentication module further makes it possible to end the authentication message by sending an interruption signal to the processor 101.

Figure 3:
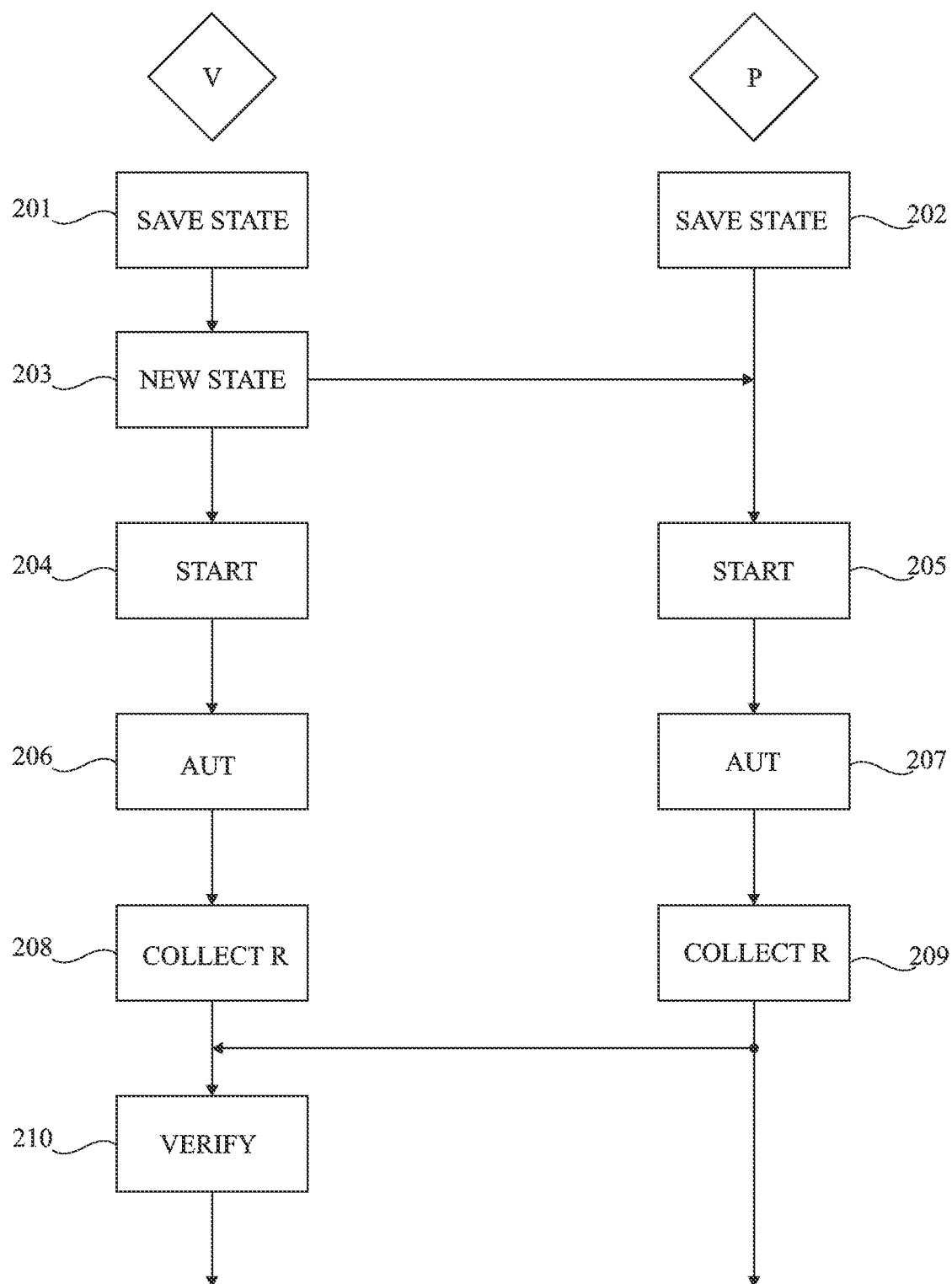
FIG. 3 shows, in block diagram form, a flowchart illustrating one embodiment of an authentication method.

FIG. 3 is a flowchart illustrating steps of one embodiment of an authentication message of a device, of the type of the device 100 described in relation with FIGS. 1 and 2, by a device V also of the type of the device 100 described in relation with FIGS. 1 and 2.

The two devices V and P may typically be at least partially identical devices, that is to say that they are made up of at least one set of common electronic components, connected and arranged in the same way, and that at least some of them implement one or several similar or identical software components. As an example, the devices V and P are identical. As an example, the devices V and P are circuits coming from a same production chain.

The authentication method implemented here is a method of the Verifier/Prover type in which the device V acts as verifier, and the device P acts as prover. The devices V and P being functionally identical, the roles of verifier and prover can be inverted upon each new implementation of the authentication method.

The implementation of the authentication method of the device P by the device V is as follows.

In simultaneous steps 201 and 202, illustrated by blocks SAVE STATE, the devices V and P record, or save, the state of their processor. More specifically, the instruction in the process of being executed and the data processed by the processor of the device V, respectively of the device P, are stored in part of a memory of the device V, respectively of the device P, for example, in its volatile memory.

In a step 203, illustrated by a block NEW STATE, the device V initializes the state of its processor, and shares this state with the device P such that the two devices V and P are in the same state.

To that end, the authentication module of the device V uses its data generating module to generate a datum S. The authentication module further uses its interruption circuit to define the end moment of the authentication method using a datum N. As an example, when the interruption circuit is a counter, the authentication module defines a number of iterations, and the datum N is the maximum number of iterations. In turn, the processor of the device V generates a background datum, or series of background data, C. The processor further defines an address A at which to start the instructions to be executed during the authentication method.

The device V transfers, to the device P, the data S, N and C, and the address A. Thus, the device P can modify the state of its processor to place it in the same state as the processor of the device V.

In simultaneous steps 204 and 205, illustrated by blocks START, the devices V and P each start their authentication module to indicate to their processor to start the implementation of instructions. Each processor then starts the instructions at the address A by using the datum S and the background datum, or the series of background data, C. More specifically, each processor begins to execute a series of instructions stored at the address A and applies these instructions, or computations, to the data S and C. The result of these computations is the datum to be verified.

In simultaneous steps 206 and 207, illustrated by blocks AUT, the processors of the devices V and P perform the series of instructions until the interruption circuit of the authentication module sends an interruption. According to one example, the processors can perform the same instructions over several iterations, and, if the interruption modules of the devices V and P are counters, the interruption signals of these modules are sent once the number of iterations has exceeded the threshold defined by the datum N.

During these steps, the processors of the devices V and P are not configured to account for the interruption signals IT-EXT sent by other components of the devices V and P.

In steps 208 and 209, illustrated by the blocks COLLECT R, the devices V and P recover the last result datum, denoted R, obtained by the computations done during the implementation of the instructions by their respective processors.

The device P next sends its result datum to the device V.

According to a variant embodiment, the device P can implement an intermediate step for encryption of the datum R making it possible to send an encrypted datum to the device V. In this case, the device V can implement a decryption step after receiving the datum R from the device P.

In a step 210 (VERIFY), the device V verifies whether the datum R received from the device P is the same as that which it obtained. To that end, the device V uses a verification function. The verification function uses, as input, the datum R obtained by the device V and the datum R obtained by the device P, and provides, as output, information representative of the result of the authentication, for example, a flag comprising a True state and a False state. The True state means that the authentication worked and the False state means the reverse.

A final step (not shown in FIG. 3) of the method can be a step for restoring the state of the processors of the devices P and V saved in steps 201 and 202, allowing the devices P and V to pick up where they were before the authentication method.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
authenticating, by a first device, a second device;
restricting, during the authentication of the second device and under control of authentication circuitry of the first device, access of a processor of the first device to one or more memory areas of the first device, the restricting including interrupting the authenticating in response an attempt of the processor to access a first area of the one or more memory areas of the first device; and
restricting, during the authentication of the second device and under control of authentication circuitry of the second device, access of a processor of the second device to one or more memory areas of the second device, the restricting including interrupting the authenticating in response an attempt of the processor to access a first area of the one or more memory areas of the second device, wherein the authenticating includes:
generating, using the first device, a first datum;
generating, using the second device, a second datum; and
authenticating, by the first device and based on the first datum and the second datum, the second device.

2. The method according to claim 1, comprising:
responding, by the authentication circuitry of the first device, to an attempt of the processor of the first device to read a second area of the one or more memory areas of the first device by providing dummy data to the processor of the first device; and
responding, by the authentication circuitry of the second device, to an attempt of the processor of the second device to read a second area of the one or more memory areas of the second device by providing dummy data to the processor of the second device.

3. The method according to claim 1, wherein the authentication is of a Verifier/Prover type.

4. The method according to claim 1, wherein:
the one or more memory areas of the first device include at least one volatile memory area, and at least one non-volatile memory area; and
the one or more memory areas of the second device include at least one volatile memory area, and at least one non-volatile memory area.

5. The method according to claim 4, wherein the authentication circuitry of the first device restricts reading by the processor of the first device of data stored in said at least one volatile memory area, and at least one part of said at least one non-volatile memory area.

6. The method according to claim 5, wherein said at least one part of said at least one non-volatile memory area is a part only storing data.

7. The method according to claim 1, wherein the authentication circuitry of the first device restricts the processor of the first device from writing data in at least one memory area of the one or more memory areas of the first device.

8. The method according to claim 1, wherein the authentication circuitry of the first device restricts the processor from writing data in all of the one or more memory areas of the first device.

9. The method according to claim 1, wherein the authentication circuitry of the first device restricts the processor from executing instructions stored in at least one memory area of the one or more memory areas of the first device.

10. The method according to claim 4, wherein the authentication circuitry of the first device restricts the processor from executing instructions stored in said at least one volatile memory area, and at least one part of said at least one non-volatile memory area.

11. The method according to claim 1, wherein the authenticating comprises:
saving a state of the processor of the first device and saving a state of the processor of the second device.

12. The method according to claim 1, wherein the authenticating comprises sharing state information of the second device with the processor of the first device.

13. The method according to claim 12, wherein the authentication circuitry of the first device generates the shared state information.

14. The method according to claim 1, wherein:
the processor of the first device generates the first datum by executing instructions; and
the processor of the second device generates the second datum by executing the same instructions.

15. The method according to claim 1, wherein the authentication circuitry of the first device comprises a circuit configured to generate an interruption signal of the authentication method.

16. A system, comprising:
a first device having a processor, memory, and authentication circuitry coupled between the processor and the memory; and
a second device having a processor, memory, and authentication circuitry coupled between the processor and the memories, wherein the first and second devices, in operation, concurrently execute an authentication process, the authentication process including:
restricting, under control of the authentication circuitry of the first device, access of the processor of the first device to the memory of the first device, the restricting including interrupting the authenticating process in response an attempt of the processor of the first device to access a first area of the memory of the first device; and
restricting, under control of the authentication circuitry of the second device, access of the processor of the second device to the memory of the second device, the restricting including interrupting the authenticating process in response an attempt of the processor of the second device to access a first area of the memory of the second device;
generating, using the first device, a first datum;
generating, using the second device, a second datum; and
authenticating one of the first device and the second device by the other of the first device and the second device based on the first datum and the second datum.

17. The system of claim 16, wherein the authenticating comprises:
responding, by the authentication circuitry of the first device, to an attempt of the processor of the first device to read a second area of the memory of the first device by providing dummy data to the processor of the first device; and
responding, by the authentication circuitry of the second device, to an attempt of the processor of the second device to read a second area of the memory of the second device by providing dummy data to the processor of the second device.

18. The system of claim 16, wherein:
the memory of the first device includes at least one volatile memory area, and at least one non-volatile memory area; and
the memory of the second device includes at least one volatile memory area, and at least one non-volatile memory area.

19. The system of claim 18, wherein the authentication circuitry of the first device restricts reading by the processor of the first device of data stored in said at least one volatile memory area, and at least one part of said at least one non-volatile memory area.

20. The system according to claim 16, wherein the authenticating comprises:
saving a state of the processor of the first device and saving a state of the processor of the second device.

21. The system according to claim 16, wherein the authenticating comprises sharing state information of the second device with the processor of the first device.

22. A device, comprising:
a processor;
memory; and
authentication circuitry coupled between the processor and the memory, wherein, in operation, the device currently executes an authentication process with a mirror device, the authentication process including:
restricting, under control of the authentication circuitry, access of the processor to the memory, the restricting including interrupting the authenticating process in response an attempt of the processor to access a first area of the memory; and
generating a first datum, wherein the authenticating is based on the first datum and a second datum generated by the mirror device.

23. The device of claim 22, wherein, in operation, the device authenticates the mirror device based on the first datum and the second datum.

24. The device of claim 22, wherein, in operation, the device provides the first datum to the mirror device during the authentication process.

25. The device of claim 22, wherein, in operation, the device provides the first datum to the mirror device in an encrypted form.

26. The device of claim 22, wherein the authenticating comprises:
responding, by the authentication circuitry of the device, to an attempt of the processor to read a second area of the memory by providing dummy data to the processor.

27. The device of claim 22, wherein:
the memory of the device includes at least one volatile memory area, and at least one non-volatile memory area.

28. The device of to claim 22, wherein the authenticating comprises:
saving a state of the processor.

29. The device of claim 22, wherein the authenticating comprises sharing state information of the device with the mirror device.

30. A method, comprising:
authenticating, by a first device, a second device;
restricting, during the authentication of the second device and under control of authentication circuitry of the first device, access of a processor of the first device to one or more memory areas of the first device; and
restricting, during the authentication of the second device and under control of authentication circuitry of the second device, access of a processor of the second device to one or more memory areas of the second device, wherein:

the authenticating includes:
  generating, using the first device, a first datum;
  generating, using the second device, a second datum; and
  authenticating, by the first device and based on the first datum and the second datum, the second device; and
the restricting includes:
  responding, by the authentication circuitry of the first device, to an attempt of the processor of the first device to read a first area of the one or more memory areas of the first device by providing dummy data to the processor of the first device; and
  responding, by the authentication circuitry of the second device, to an attempt of the processor of the second device to read a first area of the one or more memory areas of the second device by providing dummy data to the processor of the second device.

\* \* \* \* \*

UNITED STATES PATENT AND TRADEMARK OFFICE
CERTIFICATE OF CORRECTION

| | |
|---|---|
| PATENT NO. | : 11,669,610 B2 |
| APPLICATION NO. | : 17/224013 |
| DATED | : June 6, 2023 |
| INVENTOR(S) | : Jean-Louis Modave et al. |

It is certified that error appears in the above-identified patent and that said Letters Patent is hereby corrected as shown below:

In the Claims

Column 12, Claim 28, Line 51:
"The device of to claim 22," should read: --The device of claim 22,--.

Signed and Sealed this
Eighteenth Day of July, 2023

Katherine Kelly Vidal
*Director of the United States Patent and Trademark Office*